US012806890B2

(12) United States Patent
Sabatino et al.

(10) Patent No.: US 12,806,890 B2
(45) Date of Patent: Nov. 24, 2026

(54) LAMINATOR DEVICE FOR PLIABLE SHEET SEMI-FINISHED PRODUCTS AND METHOD FOR PRODUCING SAID PLIABLE SEMI-FINISHED PRODUCTS

(71) Applicant: AUTOMATIC LAMINATION TECHNOLOGIES S.R.L., Caronno Varesino (IT)

(72) Inventors: Giovanni Sabatino, Caronno Varesino (IT); Dario Tamborini, Caronno Varesino (IT)

(73) Assignee: AUTOMATIC LAMINATION TECHNOLOGIES, Caronno Varesino (IT)

( * ) Notice: Subject to any disclaimer, the term of this patent is extended or adjusted under 35 U.S.C. 154(b) by 581 days.

(21) Appl. No.: 18/264,186

(22) PCT Filed: Mar. 15, 2022

(86) PCT No.: PCT/IB2022/052322

§ 371 (c)(1),
(2) Date: Aug. 3, 2023

(87) PCT Pub. No.: WO2022/195474

PCT Pub. Date: Sep. 22, 2022

(65) Prior Publication Data

US 2024/0109280 A1 Apr. 4, 2024

(30) Foreign Application Priority Data

Mar. 17, 2021 (IT) ........................ 102021000006329

(51) Int. Cl.
*B32B 37/10* (2006.01)
*B32B 3/26* (2006.01)
(Continued)

(52) U.S. Cl.
CPC .......... *B32B 37/0053* (2013.01); *B32B 3/266* (2013.01); *B32B 37/0015* (2013.01);
(Continued)

(58) Field of Classification Search
USPC .......... 242/151, 615.2, 356.1, 564.4; 225/77, 225/16; 271/9.13; 156/521, 270, 522,
(Continued)

(56) References Cited

U.S. PATENT DOCUMENTS 1,626,574 A * 4/1927 Jackson .................... B41L 5/06 242/417.3
1,823,876 A * 9/1931 Broadmeyer ....... B32B 38/1833 156/364

(Continued)

FOREIGN PATENT DOCUMENTS

CA 1323209 C 10/1993
EP 1324881 A1 7/2003
EP 1324881 B1 9/2004

OTHER PUBLICATIONS

International Search Report and Written Opinion dated Jun. 15, 2022 from counterpart International Patent Application No. PCT/IB2022/052322.

(Continued)

*Primary Examiner* — Linda L Gray
(74) *Attorney, Agent, or Firm* — SHUTTLEWORTH & INGERSOLL, PLC; Timothy J. Klima

(57) ABSTRACT

A laminator device includes advancement means adapted to determine a movement in temporal continuity of a basic sheet/lamina element and of at least one additive sheet/lamina element along a processing direction and a coupling unit adapted to approach and couple the basic sheet/lamina element to the additive sheet/lamina element; the advancement means include at least one tractor device arranged downstream of the coupling unit along the processing direction and adapted to exert a tensile action on the basic sheet/lamina element and on the additive sheet/lamina element in a mutual coupling condition.

17 Claims, 4 Drawing Sheets

Figure 1:
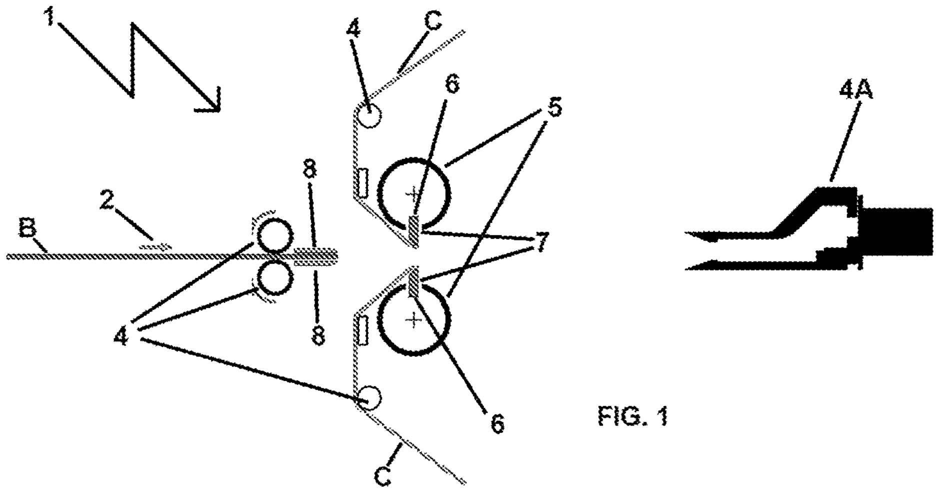

(51) Int. Cl.
*B32B 37/00* (2006.01)
*B32B 37/22* (2006.01)
*B32B 38/00* (2006.01)

(52) U.S. Cl.
CPC .............. *B32B 37/10* (2013.01); *B32B 37/22* (2013.01); *B32B 38/0004* (2013.01); *B32B 2309/105* (2013.01)

(58) Field of Classification Search
USPC ................................. 156/517, 238, 234, 459
See application file for complete search history.

(56) References Cited

U.S. PATENT DOCUMENTS

| | | | | |
|---|---|---|---|---|
| 3,143,947 | A * | 8/1964 | Limberger | G03B 27/303 53/66 |
| 3,892,618 | A * | 7/1975 | Griebat | B26D 5/26 156/577 |
| 4,378,264 | A | 3/1983 | Pilette | |
| 5,441,846 | A * | 8/1995 | Nagate | G03F 7/161 430/259 |
| 5,685,943 | A * | 11/1997 | Taguchi | B32B 38/0004 156/522 |
| 6,244,319 | B1 | 6/2001 | Maynard | |
| 9,045,292 | B1 | 6/2015 | Ben-David et al. | |
| 2003/0116598 | A1 * | 6/2003 | Huang | B65H 35/0033 225/56 |

OTHER PUBLICATIONS

1st European Office Action dated Dec. 5, 2024 from application No. 22714249.4.
2nd European Office Action dated Oct. 16, 2025 from application No. 22714249.4.
International search reported dated Jun. 15, 2022 from counterpart PCT application No. PCT/IB2022/052322.

* cited by examiner

LAMINATOR DEVICE FOR PLIABLE SHEET SEMI-FINISHED PRODUCTS AND METHOD FOR PRODUCING SAID PLIABLE SEMI-FINISHED PRODUCTS

This application is the National Phase of International Application PCT/IB2022/052322 filed Mar. 15, 2022 which designated the U.S.

This application claims priority to Italian Patent Application No. 102021000006329 filed Mar. 17, 2021, which applications are incorporated by reference herein.

The present invention relates to a laminator device, which can be used for the coupling of materials and/or semi-finished products in sheet or lamina or more generally in "thin film" (such as thin metal lamina or polymer sheets with one or more protective surface films) and can be used in various manufacturing applications such as—but not limited to—the creation of printed electronic circuits or made by electro- or photochemical engraving; moreover, the present invention relates to a method for producing of such semi-finished products in sheet (or lamina) where the latter are characterized by features of particular pliability due to their thickness and/or their constituent materials and/or their peculiar geometric/topological features.

Different types of assembly are known, in the field of so-called lamination machinery capable of operating on planar semi-finished sheets or, in any case, "laminar" semi-finished products: usually, such technologies are based on appropriate methods of advancement and retention of a "basic" laminar element, which must be coupled, on only one of its faces or on both (depending on the needs of the moment), with a very thin covering film/strip.

In some known technologies, the laminar elements, appropriately unrolled from reels, are advanced by means of a "pushing" propulsion action exerted by a pair of rollers: such rollers also approach and couple the various sheet or lamina elements with a mechanical pressure action, which can possibly be coordinated by affixing an adhesive substance interposed between the sheet/lamina elements themselves.

Alternatively, lamination and coupling technologies are known between two or more sheet/lamina materials which include discontinuously advancing and retaining the sheet element to be filmed or covered with a bed of suction cups or in any case with a matrix of support and retention elements: above this matrix of support elements the thin covering film is lowered, which is then coupled simultaneously for the entire geometric surface extension of the sheet/lamina element retained by the matrix itself.

The two known technologies mentioned above are affected by some operational limitations, in particular where it is necessary to operate on materials and/or thicknesses which are particularly critical in terms of mechanical response and resistance to stresses.

In fact, when the lamina/sheet materials to be processed and coupled are particularly "pliable" (and this can occur when the thicknesses of the semi-finished products are particularly reduced, or when they consist of metallic or non-metallic materials with mechanical strength parameters, or even when it is necessary to laminate semi-finished products with considerable "empty" areas or in any case with gaps or lightenings or real windows/gaps of material), the "continuous" processing methods made possible by the structural architecture based on pin rollers fail to ensure sufficient stability of shape and flatness, or in other words the propulsive thrust imposed on the lamina/sheet materials is such as to ripple or "curl" them, subjecting them to the so-called "Eulerian instability" phenomena (which are generated as a result of the low resistance to compression forces generated in the materials as a result of the thrust action imposed thereon).

The use of technologies based on retention on one side and on the operation in discrete batches are, however, inconvenient from the point of view of production efficiency: in fact, while eliminating the problems of mechanical instability and the impossibility of maintaining a planar condition in the semi-finished products during their approach, these technologies suffer from a considerable slowness—or in other words, from a low productivity—precisely because of the need to retain the basic laminate in position on its entire surface.

The technical task of the present invention is therefore to provide a laminator device, and a related production method (implemented through the laminator device or machinery itself), which overcome the limitations of the prior art mentioned above.

Within the scope of such a technical task, it is the main object of the invention to provide a laminator device which can have a considerable operational efficiency in terms of production, together with a high efficiency in maintaining the right conditions of geometric planarity and surface regularity of the semi-finished sheet metal/sheet/lamina products to be processed, also and above all in conditions of intrinsic "pliability" of the semi-finished products themselves (such as particularly reduced thicknesses, constituent materials not sufficiently resistant to mechanical stresses and in particular not sufficiently resistant to bending, twisting or compressive stresses with respect to their cross-section to the lying plane . . . or even in the case of a structure of the sheet/lamina material which possesses considerable empty or discontinuous internal portions, with openings, cuts, material gaps and the like).

It is further an object of the invention to provide a laminator device which can be quickly and accurately put into operation with respect to a wide range of sheet or lamina semi-finished products, and which can therefore operate with different types of materials, with or without appropriate adhesives to be interposed between the semi-finished products during the coupling/lamination and which is ultimately applicable with extreme flexibility to different manufacturing fields.

Non less, an object of the present invention is to provide a production/manufacturing method which is capable of obtaining semi-finished products in lamina and/or in sheet which consist of at least approaching/coupling components in lamina/sheet/thin film and which are particularly "pliable" by material constitution or geometric features: such a method must ensure high manufacturing quality of the semi-finished product, high production rate and considerable ease and flexibility of application in different manufacturing fields.

The technical task mentioned and the object stated are substantially achieved by a laminator device containing the technical features of claim 1, and/or in one or more of the claims dependent thereon, as well as containing one or more structural and/or functional features hereinafter illustrated or described.

Figure 2:
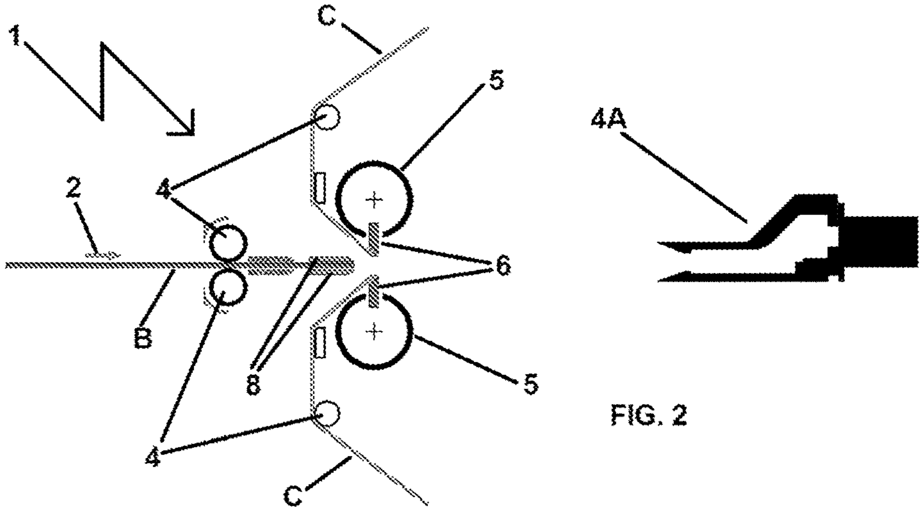
Figure 3:
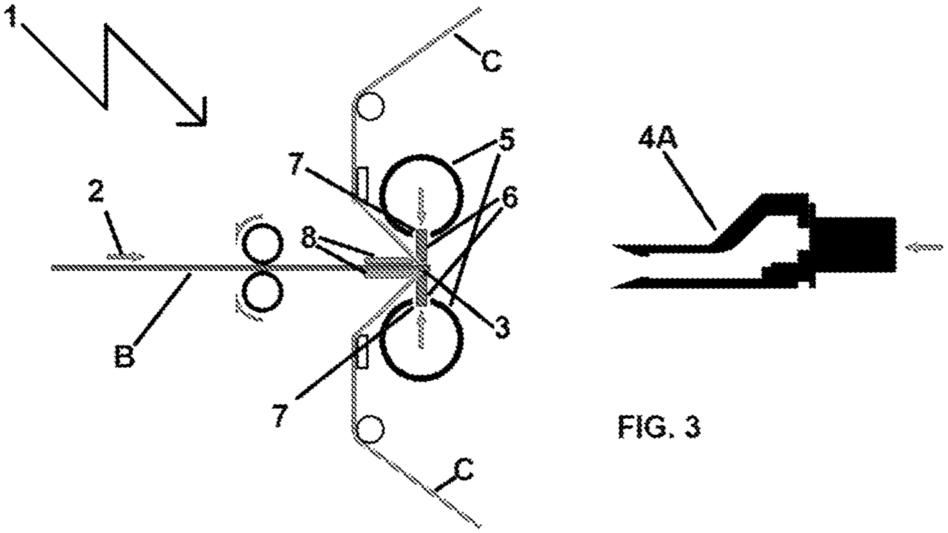
Figure 4:
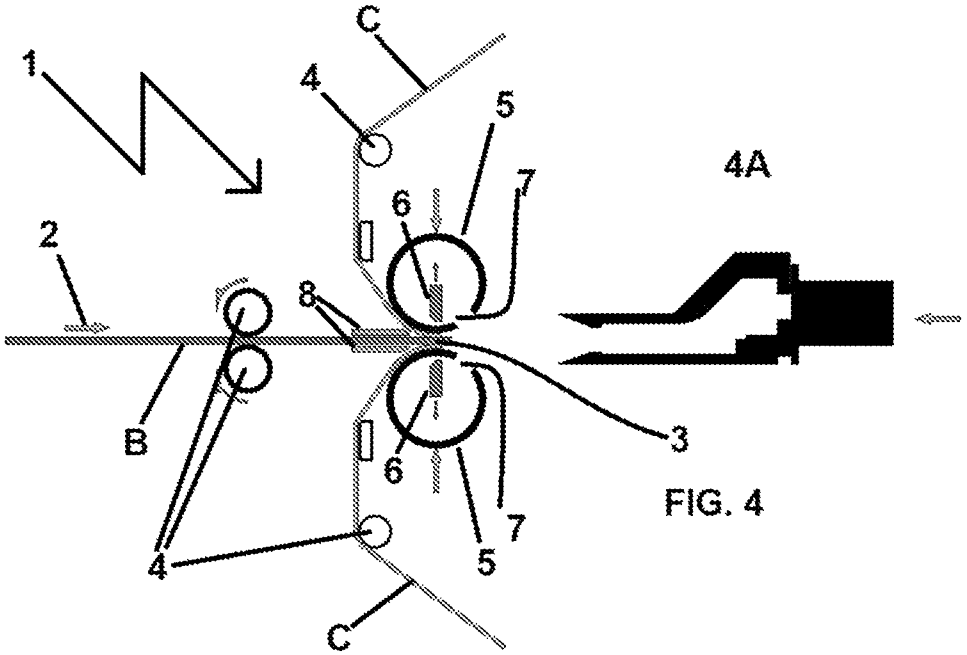
Figure 5:
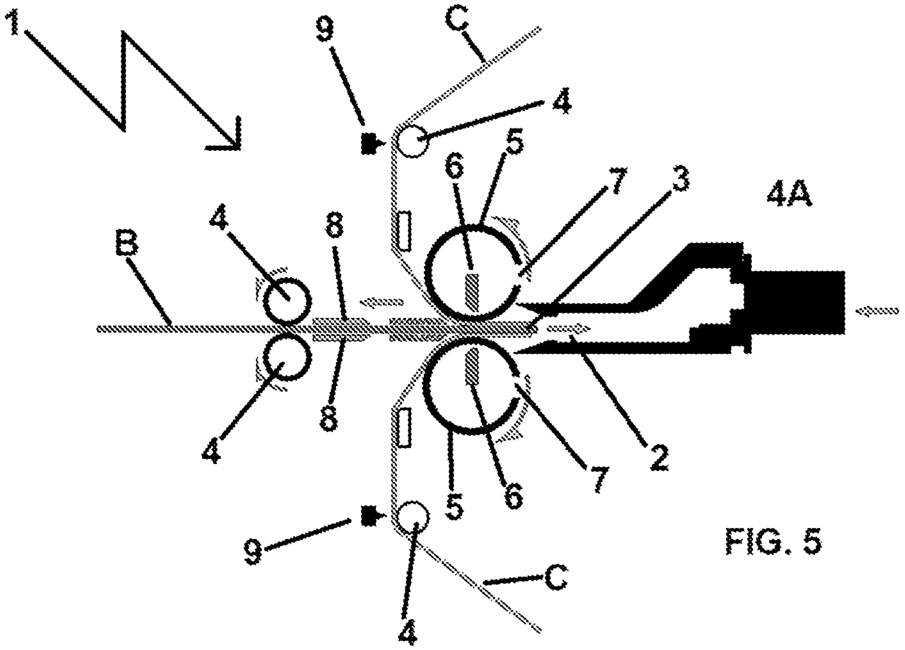
Figure 6:
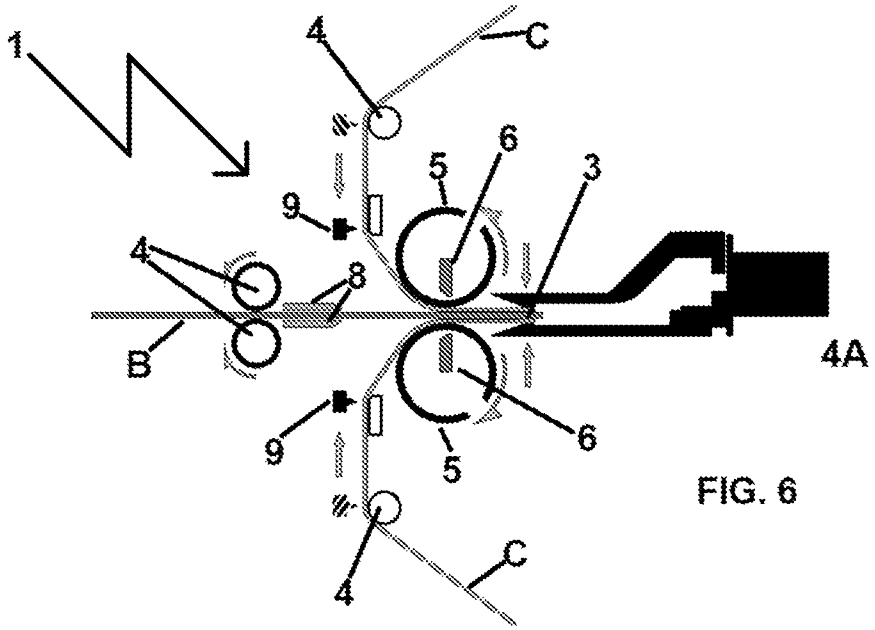
Figure 7:
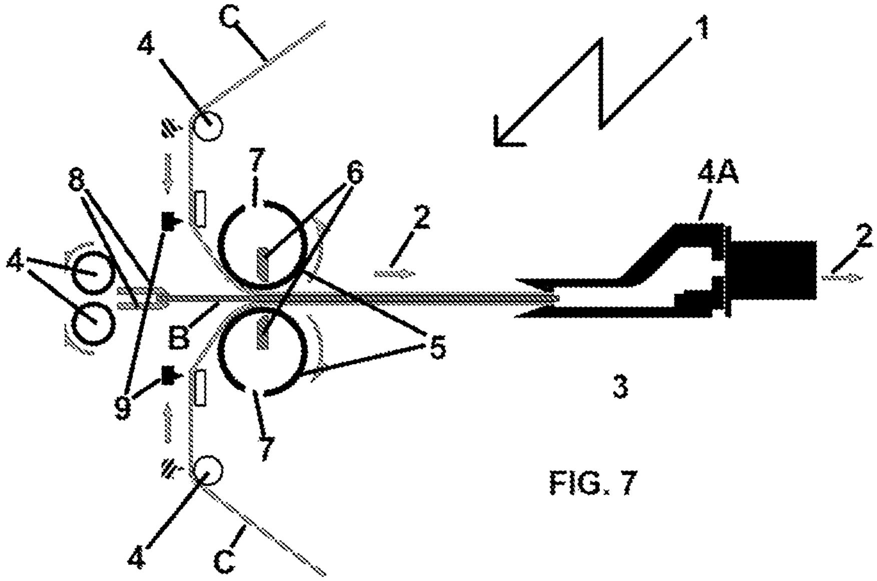
Figure 8:
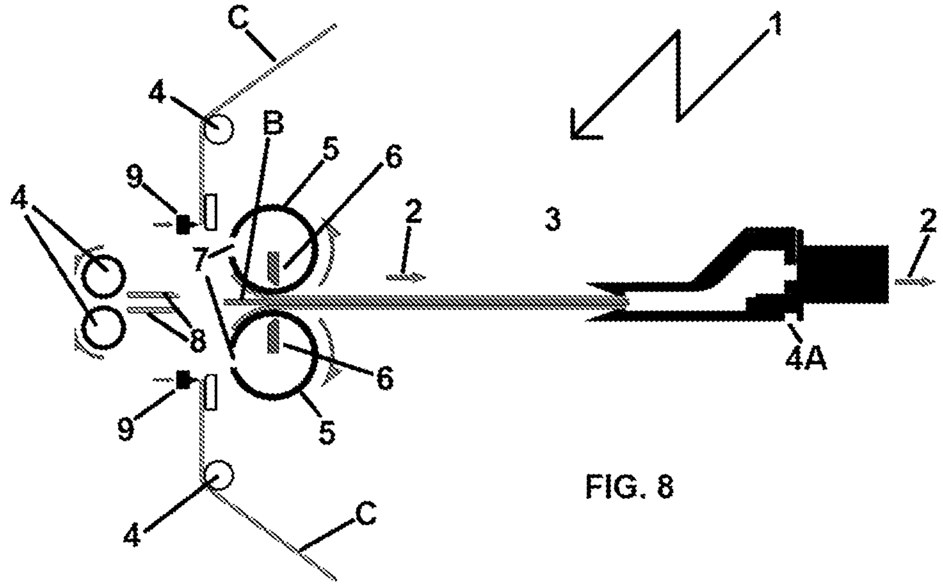

The present invention will now be described with reference to the accompanying drawings which, by way of example only, illustrate implementation thereof, wherein:

FIGS. 1 to 8 show schematic views of the fundamental structural components of a laminator device or machinery in accordance with the invention in an operating sequence ordered progressively over time (and more in detail, ordered temporally in progressive order during the execution of a production cycle).

With reference to the accompanying figures, the number 1 globally represents a lamination device or machinery (or "laminator" as the case may be) in accordance with the present invention: this device essentially has the main technical function of making a semi-finished product defined by the combination of two sheet and/or lamina elements as will be further detailed below and from the structural point of view comprises appropriate advancement means 4 adapted to determine a movement in temporal continuity of at least one basic sheet/lamina element "B" and of at least one additive sheet/lamina element "C" along a processing direction 2 (it should be noted in this regard that the present device or machinery 1 is thus adapted to perform a production of the semi-finished product under conditions of temporal continuity, unlike the known machines which are based on the temporary retention of a discrete rectangle of sheet or lamina material in basically static conditions).

Conveniently, the device 1 according to the invention comprises a coupling unit adapted to approach and couple the aforementioned basic "B" and additive "C" sheet/lamina elements along at least one face of the basic sheet/lamina element "B", and more in detail such a coupling will occur at least at (or in other words "starting from") a coupling line 3 substantially transverse—and for example perpendicular—to the processing direction 2 visible in the accompanying drawings.

Advantageously, in the present invention, the advancement means 4 comprise at least one tractor device 4A (in the accompanying drawings, it has been depicted as a gripper, which, depending on the needs of the moment, can also be present in a number of equivalent components also greater than one): such a tractor device 4A is arranged downstream of the coupling unit, always along the processing direction 2, and is adapted to exert a tensile action on the basic sheet/lamina element "B" and on the additive sheet/lamina element "C" in a mutual coupling condition.

It should be noted at this point that the innovative and original combination (with the relative functional synergy which derives therefrom) between the advancement means (or in any case of movement "in temporal continuity") 4 and the tractor device 4A allows to work, with high efficiency and without geometric instability problems, particularly pliable sheet/lamina elements, i.e., according to the terminology adopted to describe and claim the invention itself, sheet/lamina elements which due to their very low thicknesses and/or due to their mechanical features (mainly, their resistance to compression stresses) and/or due to their geometry or topology having numerous discontinuities and/or material gaps within their perimeter, cannot be pushed by traditional movement rollers (which are instead present on the laminator devices or machinery of the known type based on rollers . . . which in fact push the elements in processing instead of pulling them).

In further detail, it should be noted that in the device 1, it can be observed that the advancement means 4 comprise appropriate feeding means in temporal continuity of the basic sheet/lamina element "B" and of the additive sheet/lamina element "C": such feeding means are arranged upstream of the coupling unit along the processing direction 2 and are exemplarily depicted as a series of tensioning rollers or cylinders in the accompanying drawings, in which they are shown in various steps of the work cycle—or production method as the case may be, as will be shown in greater detail below—in different and progressive conditions of functional association to the sheet/lamina elements (such means are therefore adapted to allow an unwinding and/or a dispensing of the basic sheet/lamina element "B" and of the additive sheet/lamina element "C", for example from appropriate storage reels).

Focusing instead on the coupling unit, it can be seen that this comprises at least one pressing device 5, which defines a passage throttling along the processing direction 2 (such a passage throttling can be crossed by the basic sheet/lamina element "B" and by the additive sheet/lamina element "C", as visible in the central part of the appended schematic drawings) and is more precisely defined at the aforementioned coupling line 3.

Conveniently, the coupling unit also comprises (at least) a pre-fixer 6, which is cooperatively active with the pressing device 5 and is adapted to define the coupling line 3: as already mentioned above, the basic sheet element "B" and the additive sheet element "C" are seamlessly coupled starting from the coupling line 3 along the processing direction 2 (and such a "first" coupling occurs precisely at the action of the pre-fixer 6, which acts by mechanical pressure on the two sheet/lamina elements so as to promote the initial association thereof in a geometrically precise and uniquely defined manner).

In the schematically illustrated embodiment of the device 1, the pre-fixer 6 is at least partially inscribed in a pressing device 5 and is reversibly configurable between a non-intervention condition in which it is withdrawn inside the pressing device 5 itself and a marking condition in which it partially emerges from the pressing device 5 and is therefore functionally adapted to define the coupling line 3 on the basic sheet/lamina element "B" and on the additive sheet/lamina element "C".

To ensure the necessary functional coordination with the pre-fixer 6, the pressing device 5 can conveniently comprise a passage opening 7, which is adapted to allow at least a partial emergence of the pre-fixer 6 at said marking condition thereof.

Still with reference to the accompanying drawings, it should be noted that the coupling unit comprises two pressing devices 5 (which in the illustrated example are configured in the manner of cylinders or rollers) arranged in a mutually facing and mutually counter-rotating relationship with respect to opposite faces of the basic sheet/lamina element "B" along the processing direction 2, as well as two pre-fixers 6 respectively housed in each of the two pressing devices 5: the two pre-fixers 6 are coordinately emerging from the pressing devices 5 themselves, so as to determine respective marking conditions on opposite faces of the basic sheet/lamina element "B" and on the additive sheet/lamina element "C" associated and coupled to the basic sheet/lamina element "B" itself.

It should be noted that according to what has been described so far, the presence of an additive sheet/lamina element "C" has been mentioned, but the present invention can conveniently operate to make a semi-finished product in which the sheet/lamina element "B" is associated and coupled to two (or even more than two) additive sheet/lamina elements "C": such additive elements can typically be associated with opposite faces of the basic element "B", as illustrated in the drawings annexed to the present description.

In structural terms, the invention can further include the presence of at least one, and for example two invitation bodies 8 cooperatively active with at least one or more pressing devices 5 to facilitate a movement of the basic sheet/lamina element "B" and the additive sheet/lamina element "C" in the passage throttling: conveniently, such an invitation body 8 is reversibly configurable between a distal condition, in which it is substantially separated from the pressing device 5 (or however it is placed at a distance such as not to interfere with the pressing device 5) and a proximal condition, in which it is instead interposed (for example, as visible in the figures at a wedge-shaped portion thereof) near or adjacent to at least one pressing device 5—and consequently, near or adjacent to the basic sheet/lamina element "B" and/or the sheet/lamina element "C".

In accordance with the invention, the coupling unit can further comprise at least one or more (for example, two) cutting elements 9 activatable on at least one additive sheet/lamina element "C" to determine selectively determinable partitions upstream of the passage throttling along the processing direction 2: as can be seen from the figures, the cutting elements 9 can be operated and/or moved in the most appropriate manner with respect to the other components of the device or machinery 1 depending on the needs of the moment.

The object of the present invention is also an innovative and original method for obtaining semi-finished sheet/lamina products, and such a method comprises the following steps:

- firstly, providing a basic sheet/lamina element "B" and at least one additive sheet/lamina element "C" (for example, in the form of strips or rolls of material or even so-called "thin films", as available in the various manufacturing fields in which the present invention may find application);
- proceeding by moving the basic sheet/lamina element "B" and the (at least) one additive sheet/lamina element "C" in appropriate advancement means, which are adapted to determine a movement in temporal continuity along a processing direction 2; and
- approaching and coupling the basic sheet/lamina element "B" to the additive sheet/lamina element "C" (or to the two or more elements "C" depending on the needs of the moment) along at least one face of the basic sheet/lamina element "B" at least at a coupling line 3 substantially transverse/perpendicular to the processing direction 2.

Advantageously, in accordance with the method underlying the present invention, the step of moving the sheet/lamina elements "B" and "C" comprises (and in an embodiment of the present method exclusively includes) an operational sub-step consisting of exerting a tensile action on the basic sheet/lamina element "B" and on the additive sheet/lamina element "C" in a mutual coupling condition: such a sub-step makes this production method particularly adapted to make a semi-finished product deriving from the approach and coupling between the basic sheet/lamina element "B" and (at least) one additive sheet/lamina element "C" having a structural constitution which in the jargon of the present invention can be defined as "pliable" or in any case not sufficiently resistant to forces or attempts to move by pushing or compression.

In other words, and in parametric terms, the present method is particularly employable for manipulating sheet/lamina elements which cooperatively define, at least during the step of approaching and coupling the basic sheet/lamina element "B" to the at least one additive sheet/lamina element "C", a semi-finished product having:

- an overall thickness between 10μ (microns) and 7000μ (microns); and/or
- a presence of through cavities and/or holes and/or through notches and/or geometric surface discontinuities at least in the basic sheet/lamina element "B" (but also, depending on the needs of the moment, in the additive sheet/lamina element "C") according to a minimum quantitative ratio of at least 10% with respect to the total surface of the semi-finished product itself (in embodiments of the present method, such minimum ratio can be equal to at least 35% or further it can be equal to at least 70% with respect to the total surface of the semi-finished product).

With regard to the range of overall thicknesses of the entire resulting semi-finished product, it can be seen how the present invention is peculiarly adapted to obtain items having an overall thickness between 15μ (microns) and 1000μ (microns), and even an overall thickness between 20μ (microns) and 100μ (microns): thereby, the present invention is capable of achieving, with the peculiar combination of structural and functional features (and primarily, by virtue of the fact of moving the sheet/lamina elements by traction rather than by pushing), an optimal processing on items or semi-finished products having a particularly "pliable" nature due to their very small thicknesses (and/or due to their constituent materials).

As already seen in the present description, a semi-finished product characterized by one or more of the parameters listed above could not be produced with "continuous" laminators operating with thrust rollers, and if it were made with "discrete retention" laminators it would still be inconvenient in terms of operating time-cycle and thus in terms of industrial cost/efficiency of the production process: it should therefore be noted that the present invention immediately solves the methodological problems deriving from the construction architectures of the known type of laminators.

Examining the method of the invention in further detail, it can be noted that at least the steps of moving the basic sheet/lamina element "B" and the at least one additive sheet/lamina element "C", of approaching and coupling the basic sheet/lamina element "B" to the additive sheet/lamina element "C" and exerting a tensile action on the basic sheet/lamina element "B" and the additive sheet/lamina element "C" are conveniently implementable with a laminator machine or device according to what is described above or according to what is claimed below.

In terms of application possibilities, the present invention can conveniently include that the basic sheet/lamina element "B" can be made of various materials and/or with different geometric features (typically but not limited to thicknesses) and/or topological features (typically but not limited to the presence of empty areas or discontinuities in the thickness within the delimitation perimeter of the sheet/lamina element itself).

In more detail, the basic sheet/lamina element "B" can have one or more of the following features:

- comprises one or more composite materials having a (typically but not limited to) polymer matrix, such as glass fibre or aramid fibre or carbon fibre, and a plurality of structural fibres dispersed in such a matrix (depending on need, such composite materials can be enriched or loaded or comprise at least one flame retardant associated with the matrix and/or the structural fibres); and/or
- comprises one or more metallic materials (such as aluminium and/or titanium and/or copper and/or steel; and/or brass and/or constantan); and/or
- comprises one or more semiconductor materials (such as silicon); and/or comprises materials belonging to the so-called "rare earth" family as usually identified in the periodic table of elements; and/or comprises one or more polymer materials (such as polyester and/or polyamide and/or vinyl and/or polyimide and/or polytetrafluoroethylene) which depending on need can have a glass transition temperature above 170° C.; and/or comprises one or more ceramic materials, such as so-called ceramic materials co-fired at low temperatures (or however ceramic materials which can have a glass transition temperature above 170° C.); and/or has a thickness between 5μ (microns) and 6000μ (microns); and/or has a presence of through cavities and/or holes and/or through notches and/or geometric surface discontinuities at least in the basic sheet/lamina element "B" (but also, depending on the needs of the moment, in the additive sheet/lamina element "C") according to a minimum quantitative ratio of at least 10% with respect to the total surface of the semi-finished product itself (in embodiments of the present method, such minimum ratio can be equal to at least 35% or further it can be equal to at least 70% with respect to the total surface of the semi-finished product).

Within the scope of the possible implementation variants indicated above, some examples—to be considered as non-limiting—in terms of the constituent materials of the basic sheet/lamina element "B" can consist of the so-called "High TG materials", i.e., by materials with a high glass transition temperature (which in terms of general knowledge of the field is established around 170° C.); alternatively, they can be considered composite materials formed by a fabric of glass fibres intertwined in a matrix of flame-retardant epoxy resin (a typical commercial name of such a material is the abbreviation "FR4" or also the word "Vetronite").

Indeed, the examples relevant to the present invention can include the so-called "Kapton materials" or also the "Rogers materials", as known in the technical field of application of the invention itself and made and placed on the market by the homonymous companies, and also the so-called "low-temperature co-fired ceramic materials" (otherwise referred to as "LTCC—Low Temperature Co-Fire Ceramics".

Still in accordance with the methodological aspects of the present invention, the additive sheet/lamina element "C" is particularly processable if it has one or more of the following features:

it belongs to the product families known in the application fields of the present invention with the trade names "dry-film photoresist" or "solder mask photoresist" or "adhesive tape" or "cover lay adhesive" or "dielectric film" (N.B.: in order to obtain sufficient clarity and sufficiency of description, it should be noted that in general these types of products are based on chemical-physical formulations of a secret nature and are mostly known to the technicians in the field by the names just reported); and/or it comprises a predetermined number of thin metallic layers packed alternately with thin layers of composite material, otherwise known with the trade/technical name of the field "Fiber Metal Laminate" or "FML" (within this family of semi-finished products, further specific names can also be mentioned such as "ARALL" (Aramid Fiber Reinforced Aluminum Laminate), "GLARE" (Glass Laminate Aluminum Reinforced Epoxy), "CARALL" (Carbon Fiber Reinforced Aluminum Laminate) or "TiGr" (Titanium-Graphite), which in fact indicate the type of metal and/or composite material present in the packing of layers); and/or has a thickness between 5μ (microns) and 1000μ (microns); and/or has a presence of through cavities and/or holes and/or through notches and/or geometric surface discontinuities at least in the basic sheet/lamina element "B" (but also, depending on the needs of the moment, in the additive sheet/lamina element "C") according to a minimum quantitative ratio of at least 10% with respect to the total surface of the semi-finished product itself (in embodiments of the present method, such minimum ratio can be equal to at least 35% or further it can be equal to at least 70% with respect to the total surface of the semi-finished product).

This invention achieves the proposed purposes, by overcoming the drawbacks complained of in the prior art.

The laminator device according to the invention first optimizes the laminating functionality in all those cases where the technologies available in the state of the art reveal the aforementioned drawbacks, and in particular optimizes the production of coupled laminates in all those cases in which extremely reduced thicknesses, constituent materials particularly "weak" from a mechanical point of view and/or the presence of considerable discontinuities and material gaps make the semi-finished products themselves "pliable" and difficult to work in conditions of geometric homogeneity and flatness.

The optimization of productivity is achieved in the present invention both in terms of overall production accruals (and this is basically linked to the choice of adopting a "continuous" process of unwinding of the semi-finished products to be coupled) and in terms of accuracy of overlapping and coupling, as well as optimal control of the coupling homogeneity in terms of adhesion and "constancy" of said adhesion on the entire surface of the semi-finished products in mutual contact.

Furthermore, such operational capacity extends to an extreme variety of couplings, even on opposite faces of the so-called "basic semi-finished product", making the present invention very adaptable and therefore possible in different manufacturing areas without particular modifications or technological adaptations.

Finally, it should be noted that the innovative and original production method provided by the present invention allows to make semi-finished products with large production rates and with high quality which, due to the "pliable" nature of their constituent components, would require, if made with the technologies of the Prior Art, considerable limitations in terms of assembly times or in any case considerable problems of maintaining flatness and structural and geometric consistency.

The invention claimed is:

1. A laminator device comprising:

an advancement device adapted to determine a movement in temporal continuity of at least one basic sheet/lamina element and at least one additive sheet/lamina element along a processing direction; and a coupling unit adapted to approach and couple said at least one basic sheet/lamina element to said at least one additive sheet/lamina element along at least one face of said at least one basic sheet/lamina element at least at a coupling line substantially transverse and perpendicular to said processing direction, said advancement device comprising at least one tractor device arranged downstream of said coupling unit along said processing direction and adapted to exert a tensile action on the at least one basic sheet/lamina element and on the at least one additive sheet/lamina element in a mutual coupling condition.

2. The device according to claim 1, wherein the advancement device comprises a feeding device in temporal continuity of the at least one basic sheet/lamina element and of the at least one additive sheet/lamina element, said feeding device being arranged upstream of said coupling unit along the processing direction and being adapted to allow an unwinding and/or a dispensing of the at least one basic sheet/lamina element and of the at least one additive sheet/lamina element.

3. The device according to claim 1, wherein the coupling unit comprises:

at least one pressing device defining a passage throttling along the processing direction crossable by the at least one basic sheet/lamina element and the at least one additive sheet/lamina element, said coupling line being defined at said passage throttling; and at least one pre-fixer cooperatively active with said at least one pressing device and adapted to define the coupling line, the at least one basic sheet/lamina element and the at least one additive sheet/lamina element being continuously coupled starting from the coupling line along the processing direction.

4. The device according to claim 3, wherein said at least one pre-fixer is at least partially inscribed in said at least one pressing device and is reversibly configurable between a non-intervention condition in which said at least one pre-fixer is withdrawn inside the at least one pressing device and a marking condition in which said at least one pre-fixer partially emerges from the at least one pressing device and is adapted to define the coupling line on the at least one basic sheet/lamina element and on the at least one additive sheet/lamina element, the at least one pressing device preferably comprising a passage opening adapted to allow at least a partial emergence of the at least one pre-fixer at said marking condition thereof.

5. The device according to claim 3, wherein the coupling unit comprises:

two pressing devices, configured as cylinders or rollers, arranged in a mutually facing and mutually counter-rotating relationship with respect to opposite faces of the at least one basic sheet/lamina element along the processing direction; and two pre-fixers respectively housed in each of said two pressing devices and coordinately emerging from the two pressing devices to determine respective marking conditions on opposite faces of the at least one basic sheet/lamina element and the at least one additive sheet/lamina element associated and coupled to the at least one basic sheet/lamina element.

6. The device according to claim, 1, wherein the coupling unit further comprises at least one invitation body cooperatively active with at least one pressing device to facilitate a movement of the at least one basic sheet/lamina element and the at least one additive sheet/lamina element in a passage throttling, said at least one invitation body being reversibly configurable between a distal condition in which said at least one invitation body is substantially separated from the at least one pressing device and a proximal condition in which said at least one invitation body is interposed, at least at a wedge-shaped portion thereof, near or adjacent to the at least one pressing device and the at least one basic sheet/lamina element and/or the at least one additive sheet/lamina element.

7. The device according to claim 1, wherein the coupling unit further comprises at least one cutting element activatable on the at least one additive sheet/lamina element to determine selectively determinable partitions upstream of a passage throttling along the processing direction.

8. A method for obtaining sheet/lamina semi-processed products, comprising the following steps:

providing a basic sheet/lamina element and at least one additive sheet/lamina element;

moving the basic sheet/lamina element and the at least one additive sheet/lamina element in an advancement device adapted to determine a movement in temporal continuity along a processing direction; and approaching and coupling the basic sheet/lamina element to the at least one additive sheet/lamina element along at least one face of the basic sheet/lamina element at least at a coupling line substantially transverse and perpendicular to the processing direction, wherein the step of moving the basic sheet/lamina element and the at least one additive sheet/lamina element comprises, and includes, a sub-step of exerting a tensile action on the basic sheet/lamina element and the at least one additive sheet/lamina element in a mutually coupling condition, and wherein the basic sheet/lamina element and the at least one additive sheet/lamina element cooperatively define, at least during the step of approaching and coupling the basic sheet/lamina element to the at least one additive sheet/lamina element, a semi-finished product having:

an overall thickness between 10μ (microns) and 7000μ (microns); and/or a presence of through cavities and/or holes and/or through notches and/or geometric surface discontinuities at least in the basic sheet/lamina element and also in the at least one additive sheet/lamina element according to a minimum quantitative ratio of at least 10% with respect to a total surface of the semi-finished product.

9. The method according to claim 8, wherein the basic sheet/lamina element:

comprises one or more composite materials having a polymer matrix, and a plurality of structural fibers dispersed in said matrix, said composite materials even more preferably comprising at least one flame retardant associated with said matrix and/or said structural fibers; and/or comprises one or more metallic materials, said metallic materials comprising aluminum and/or titanium and/or copper and/or steel; and/or brass and/or constantan;

comprises one or more semiconductor materials, said semiconductor materials:

comprising silicon; and/or comprising materials belonging to the rare earth family; and/or comprising one or more polymer materials, said polymer materials comprising polyester and/or polyamide and/or vinyl and/or polyimide and/or polytetrafluoroethylene, said polymer materials having a glass transition temperature above 170° C.; and/or comprising one or more ceramic materials, said ceramic materials comprising ceramic materials co-fired at low temperatures, said ceramic materials having a glass transition temperature above 170° C.; and/or having a thickness between 5μ (microns) and 6000μ (microns);

and wherein the at least one additive sheet/lamina element:

comprises a predetermined number of thin metallic layers packed alternately with thin layers of composite material and comprising "ARALL" or "GLARE" or "CARALL" or "TiGr" fiber metal laminate materials; and/or has a thickness between 5μ (microns) and 1000μ (microns); and/or has through cavities and/or holes and/or through notches and/or geometric surface discontinuities in a minimum quantitative ratio equal to at least 10% with respect to the total surface of the at least one additive sheet/lamina element.

10. The method according to claim 9, wherein said minimum quantitative ratio is at least 35% with respect to the total surface of the semi-finished product.

11. The method according to claim 9, wherein said minimum quantitative ratio is equal to at least 70% with respect to the total surface of the semi-finished product.

12. The method according to claim 8, wherein the semi-finished product has the overall thickness between 10μ (microns) and 7000μ (microns).

13. The method according to claim 12, wherein the overall thickness of the semi-finished product is between 15μ (microns) and 1000μ (microns).

14. The method according to claim 12, wherein the overall thickness of the semi-finished product is between 20μ (microns) and 100μ (microns).

15. The method according to claim 8, wherein the semi-finished product has the presence of through cavities and/or holes and/or through notches and/or geometric surface discontinuities at least in the basic sheet/lamina element and also in the at least one additive sheet/lamina element according to the minimum quantitative ratio of at least 10% with respect to a total surface of the semi-finished product.

16. The method according to claim 15, wherein the minimum quantitative ratio of the through cavities and/or holes and/or through notches and/or geometric surface discontinuities at least in the basic sheet/lamina element is at least 35% with respect to the total surface of the semi-finished product.

17. The method according to claim 15, wherein the minimum quantitative ratio of the through cavities and/or holes and/or through notches and/or geometric surface discontinuities at least in the basic sheet/lamina element is at least 70% with respect to the total surface of the semi-finished product.

* * * * *